US008589496B2

(12) United States Patent
Boberg et al.

(10) Patent No.: US 8,589,496 B2
(45) Date of Patent: Nov. 19, 2013

(54) METHOD AND ARRANGEMENT FOR HANDLING A SUBSCRIPTION FOR CLIENT DATA

(75) Inventors: Christer Boberg, Tungelsta (SE); Anders Lindgren, Älvsjö (SE); Mats Bergman, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 845 days.

(21) Appl. No.: 12/518,600

(22) PCT Filed: Dec. 14, 2006

(86) PCT No.: PCT/SE2006/001427
§ 371 (c)(1),
(2), (4) Date: Nov. 4, 2009

(87) PCT Pub. No.: WO2008/073009
PCT Pub. Date: Jun. 19, 2008

(65) Prior Publication Data
US 2010/0077038 A1    Mar. 25, 2010

(51) Int. Cl.
*G06F 15/16* (2006.01)
(52) U.S. Cl.
USPC ........... 709/206; 709/203; 709/204; 709/205; 709/223; 709/224
(58) Field of Classification Search
USPC ................. 709/203–206, 223–224
See application file for complete search history.

(56) References Cited

U.S. PATENT DOCUMENTS

| 2004/0003037 | A1 | 1/2004 | Fujimoto et al. | |
| 2004/0177134 | A1* | 9/2004 | Lonnfors et al. | 709/220 |
| 2004/0224694 | A1* | 11/2004 | Zhao et al. | 455/445 |
| 2005/0083904 | A1* | 4/2005 | Khartabil et al. | 370/351 |
| 2005/0198545 | A1* | 9/2005 | Wieck et al. | 713/323 |
| 2005/0262198 | A1* | 11/2005 | Leppanen et al. | 709/204 |
| 2005/0271055 | A1* | 12/2005 | Stupka | 370/389 |
| 2006/0149847 | A1* | 7/2006 | Meskauskas et al. | 709/229 |
| 2006/0256779 | A1* | 11/2006 | Lim et al. | 370/352 |

(Continued)

FOREIGN PATENT DOCUMENTS

JP    2006-094338 A    4/2006

OTHER PUBLICATIONS

Poetzl et al.; "Sipping Working Group"; Jun. 2006; Siemens; Verison 00.*

(Continued)

*Primary Examiner* — Wing F Chan
*Assistant Examiner* — Benjamin M Thieu (57) ABSTRACT

A method and arrangement for temporarily withholding notifications with client data of at least one observed client to a watching client when the watching client has an ongoing subscription for receiving the notifications from a client data server. When the watching client receives a subscription suspend trigger, the watching client sends a subscription suspend message to the client data server indicating that client data notifications should be temporarily withheld while retaining the subscription. When the watching client subsequently receives a subscription resume trigger, the watching client sends a subscription resume message to the client data server indicating that the suspended subscription shall be resumed and allowing client data notifications to be delivered again. The watching client then subsequently receives client data notifications according to the subscription.

23 Claims, 4 Drawing Sheets

(56) References Cited

U.S. PATENT DOCUMENTS

| | | | |
|---|---|---|---|
| 2007/0100981 A1* | 5/2007 | Adamczyk et al. | 709/223 |
| 2007/0288621 A1* | 12/2007 | Gundu et al. | 709/223 |
| 2008/0084977 A1* | 4/2008 | Nayak et al. | 379/130 |

OTHER PUBLICATIONS

Doc#OMA-PAG-2006-0847-CR_PRS2_Section 5.2.9_RDRR_1-27 A030_31 Change Request; RDRR A030-31, Dec. 11, 2006; retrieved from: http://member.openmobilealliance.org/ftp/public_documents/PAG/2006/; the whole document.

OMA Presence SIMPLE 2.0 Requirements; Draft Version 1-27 2.0—Oct. 30, 2006; Open Mobile Alliance; OMA-RD-Presence_SIMPLE-V2_0-20061030-D; retrieved from: http://member.openmobilealliance.org/ftp/public_documents/PAG/Permanent_documents/; section 5.2.9.

Presence SIMPLE Specification; Draft Vers;on 2.0—Nov. 23, 2006; Open Mobile Alliance; OMA-TS-Presence_SIMPLE-V2_0-20061123-D; retrieved from: http://member.openmob;leall;ance.org/ftp/public_documents/PAG/Permanent_documents/; sections 5.2; 5.3; 5.5.

* cited by examiner

METHOD AND ARRANGEMENT FOR HANDLING A SUBSCRIPTION FOR CLIENT DATA

TECHNICAL FIELD

The present invention relates generally to a method and arrangement for handling a subscription for client data of an observed client. In particular, the present invention can be used to temporarily withhold client data notifications to a watching client.

BACKGROUND

With the emergence of 3G mobile telephony, new packet-based communication technologies using IP (Internet Protocol) have been developed to support wireless communication of multimedia. For example, communication protocols in GPRS (General Packet Radio Service) and WCDMA (Wideband Code Division Multiple Access) support packet-switched multimedia services, as well as traditional circuit-switched voice calls.

A network architecture called "IP Multimedia Subsystem" (IMS) has been developed by the $3^{rd}$ Generation Partnership Project (3GPP) as a platform for handling multimedia services and sessions in the packet domain, based on IP transport. Thus, an IMS network can be used to initiate and control multimedia sessions for any IP enabled terminals being connected to any type of access networks. A signalling protocol called "SIP" (Session Initiation Protocol, according to the standard IETF RFC 3261) is typically used for handling sessions in IMS networks. A "SIP-enabled" terminal can thus use this standard to initiate and terminate multimedia communications with other terminals and servers by means of its home IMS network.

Figure 1:
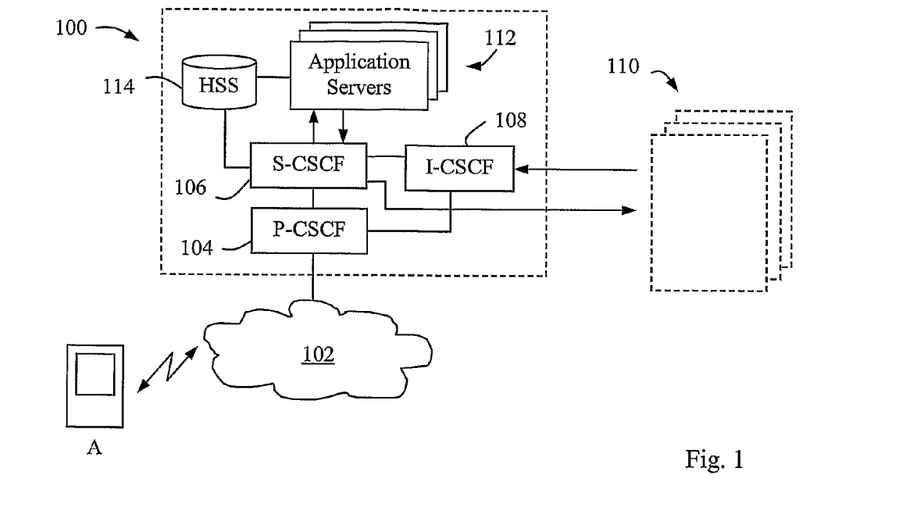
FIG. 1 is a schematic overview of an IMS network capable of providing multimedia services for a terminal A, according to the prior art.

FIG. 1 is a simplified schematic illustration of a basic network structure for providing multimedia services for a client using a terminal A by means of an IMS network 100. In this example, terminal A is a mobile terminal connected to a radio access network 102, even though IMS can be used for fixed terminals as well. An IMS terminal is often generally referred to as "User Equipment (UE)".

The access network 102 is connected to IMS network 100, which is the "home" IMS network of terminal A and therefore handles multimedia services for terminal A. Basically, multimedia services are handled by the terminal's home IMS network even when roaming in a visited access network. Any multimedia sessions and services for the client of terminal A are controlled by specific session managing nodes in the IMS network 100, including a P-CSCF (Proxy Call Session Control Function) node 104, an S-CSCF (Serving Call Session Control Function) node 106, and an I-CSCF (Interrogating Call Session Control Function) node 108, according to the conventional IMS architecture of today.

Briefly described, the P-CSCF node 104 acts as the entry point for clients towards the IMS network 100 from access networks, including network 102. A plurality of S-CSCF nodes in the IMS network 100 are assigned to different active terminals for managing their sessions using SIP signalling, and the shown S-CSCF node 106 handles sessions for terminal A in this example. Further, the I-CSCF node 108 acts as a gateway basically receiving SIP messages from other IMS networks 110.

The IMS network 100 also includes one or more application servers 112 for different multimedia services, and a main database node HSS (Home Subscriber Server) 114 where various subscriber and authentication data is stored for clients. The various functions of the shown network elements in IMS network 100 are generally known in the art, but are not necessary to describe here further to understand the context of the present invention.

Each application server 112 supports one or more specific multimedia services such as "Instant Messaging" (IM), "Push-to-talk over Cellular" (PoC) and "Presence", where SIP signalling is used to control sessions. In particular, presence services basically make data related to an observed client available to other watching clients.

In this description, the term "presence data", or generally "client data", is used to represent information on the state or situation of a client and his/her equipment in any predefined respect. Briefly described, presence data of a client is published by storage at an application server generally referred to as a "presence server", which can be supplied to other clients subscribing to that presence data. The presence data may refer to the following exemplary client states:

- A personal status, e.g. available, busy, in a meeting, on holiday, etc.
- A terminal status, e.g. switched on/off, engaged, out of coverage, etc.
- The geographic location of the client/terminal.
- Terminal capabilities, e.g. functionality for SMS, MMS, chat, IM, video, etc.
- Terminal selections, e.g. call forwarding, language, etc.
- Other client information, e.g. interests, occupations, personal characteristics, moods, personal logos, logo depending on the current mood, etc.

This type of information is continually stored in presence servers in the IMS network, based on publications of so-called "client events" received from clients or from their access networks, whenever any presence data for a client is introduced, updated, changed or deleted. A client may thus also subscribe for selected presence data of one or more other clients which is also handled by an application server in the IMS network.

In this description, the term "client" will be used to generally represent a user equipment (or communication terminal) and its user. Further, the term "watching client" represents a client that subscribes or requests for presence data (sometimes also referred to as the "Watcher"), and the term "observed client" represents a client that publishes presence data (sometimes also referred to as the "Presentity") to be available for authorised watching clients.

A SIP message called "SIP PUBLISH" is generally used by observed clients to send their presence data to the presence server for publication. The SIP PUBLISH message can be used basically in four different cases, namely: 1) to initiate new data, 2) to "refresh" data (i.e. confirming that earlier initiated data continues to be valid), 3) to modify data, and 4) to terminate data no longer valid.

Another SIP message called "SIP SUBSCRIBE" is used by watching clients to subscribe for presence data of observed clients, and only authorised clients are entitled to receive such data. The SIP SUBSCRIBE message can be used to obtain presence data either just once or on plural occasions, as determined by a time-out parameter that can be set in that message, often referred to as TTL, "Time To Live".

If the time-out parameter in a SIP SUBSCRIBE message is set to zero, a notification with requested presence data is obtained just once and the subscription is promptly terminated thereafter. If the time-out parameter is set to a certain time period>0, the watching client will receive notifications until the subscription period expires. Notifications can then be received either automatically using a "push"-type mechanism, e.g. regularly or whenever the data is changed, or upon demand using a "pull"-type mechanism.

Figure 2:
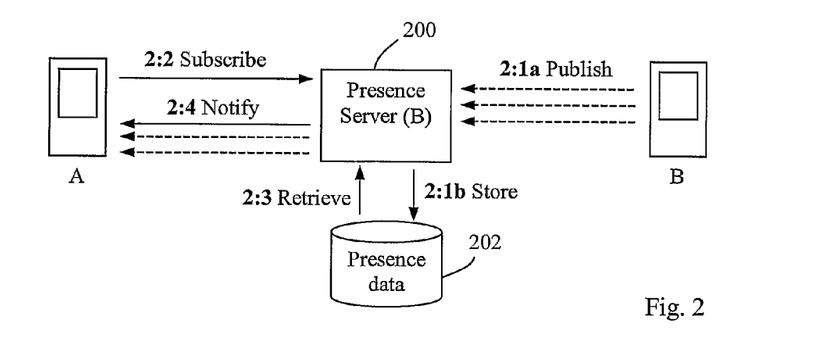
FIG. 2 is a block diagram illustrating a conventional procedure for obtaining presence data of an observed client, according to the prior art.

FIG. 2 illustrates the present conventional procedure for providing presence data, involving the user equipment A of a watching client and the user equipment B of an observed client belonging to an IMS network comprising a presence server 200 acting for client B. The presence data for client B is maintained in a presence database 202 associated with presence server 200. As shown in the figure, clients A and B are represented by mobile terminals even though the described procedure can be applied for fixed terminals as well.

A first step 2:1a generally illustrates that the observed client B publishes presence data by frequently sending SIP PUBLISH messages to the presence server 200 according to conventional routines, as described above. Certain data for client B can also be sent from client B's access network (not shown), e.g. location data and terminal status data. A next step 2:1b illustrates that database 202 is updated accordingly in response to receiving the SIP PUBLISH messages of step 2:1a. Steps 2:1a and 2:1b continue throughout in the background, according to prevailing routines.

Client A can subscribe to specific presence data by establishing a dialogue with the presence server in which notifications can be received. In a step 2:2, client A thus sends an SIP SUBSCRIBE message as a subscription request for presence data of client B, in which a desired subscription time period is specified for the dialogue. As mentioned above, if the client A wants to receive presence data of client B just once (the pull mechanism), the subscription time=0, but if he/she wants to receive presence data over a longer period (the push mechanism), the subscription time>0. The presence server 200 then retrieves presence data of client B in a step 2:3, and sends it to client A in an initial notification message SIP NOTIFY, as shown in a step 2:4.

As indicated by the dashed arrows, client A may receive such notifications on further occasions during the given subscription time, either at regular intervals or whenever the presence data is changed. The presence server will also reserve certain server resources throughout the subscription period needed to maintain the subscription and provide the desired presence data of client B to client A, including communication and processing resources to receive and forward notifications. In order to prolong or "refresh" the subscription, client A may send further SIP SUBSCRIBE messages just before the subscription time expires, and the presence server will then continue to maintain the subscription and the associated resources.

A watching client may also subscribe to presence data of plural observed clients, which often results in numerous notifications for updated presence data being sent to the watching client. An information delivery server has therefore been proposed called the RLS, "Resource List Server" acting to collect notifications from the observed clients in order to send a single notification for all observed clients to the watching client. This mechanism is sometimes called the "exploder" function. Another solution for reducing the number of notifications by using a combined push/pull mechanism, is disclosed in WO 2005/088949 (Telefonaktiebolaget LM Ericsson AB).

However, if the client user do not want to receive any presence notifications during a limited period, e.g. when not wanting to be disturbed or when being occupied in a session or call or otherwise, the subscription must be terminated. In order to resume the notifications, the subscription must then be re-created, i.e. a completely new subscription must be established. This procedure will now be briefly described with reference to a block diagram in FIG. 3 containing a watching client A, a presence server 300 providing presence data on an observed client B (not shown), as well as a P-CSCF node 302 and an S-CSCF node 304 in an IMS network of the watching client A. It is assumed that a subscription has been created basically in the manner described for FIG. 2 above, and that client A frequently receives notifications with presence data of client B, accordingly.

Figure 3:
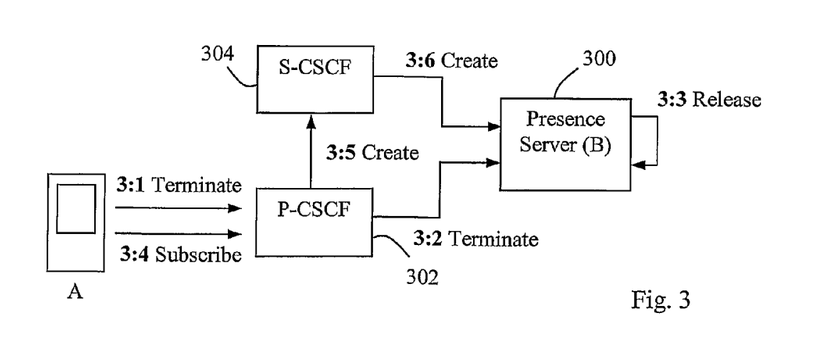
FIG. 3 is a block diagram illustrating a conventional procedure for withholding notifications with presence data of an observed client, according to the prior art.

The user of client A has now decided to withhold the notifications during a period of time, for some reason, and terminates the subscription by means of a suitable input command in the used terminal. In a first step 3:1, client A therefore sends a subscription request message in the current dialogue to the P-CSCF node 302 with the TTL or subscription time set to zero, such as: SIP SUBSCRIBE (expires=0), in order to terminate the ongoing subscription. The P-CSCF node 302 then routes the subscription request message to the presence server 300, in a step 3:2.

The presence server 300 then terminates the subscription and releases all server resources being reserved for the subscription, as indicated by a further step 3:3. Server 300 may also send a final notification to client A at this point, not shown. This means of course that no further presence notifications on client B will be communicated to client A.

When the user of client A later wants to re-create his/her presence subscription, a new dialogue must be established with server 200 and a new subscription request message is sent to the P-CSCF node 302, in a next step 3:4, such as: SIP SUBSCRIBE (expires>0). The P-CSCF node 302 then routes the subscription request message to the S-CSCF node 304 which is given in the request, in a following step 3:5, to re-create the subscription. It should be noted that the S-CSCF node 304 is needed for routing the request to the correct destination, being a request for a completely new subscription. The S-CSCF node 304 accordingly routes the subscription request message of client A to the presence server 300, in a further step 3:6. The presence server 300 will thus establish a new subscription for client A, which involves checking whether client A is authorised to receive presence data of client B as well as reserving various needed server resources for the subscription.

Figure 4:
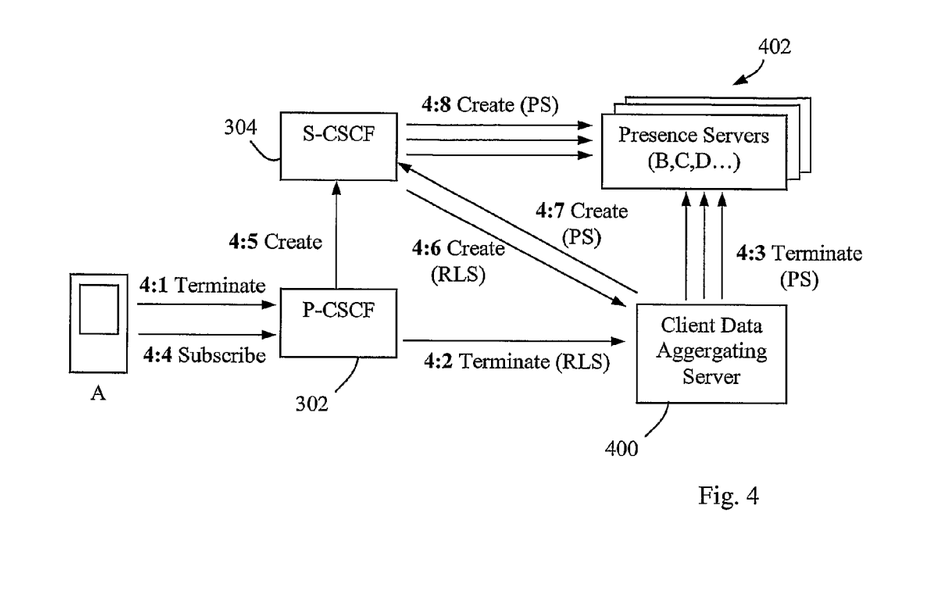
FIG. 4 is a block diagram illustrating a conventional procedure for withholding notifications with presence data of plural observed clients using an RLS node, according to the prior art.

FIG. 4 illustrates a similar procedure when the watching client A subscribes for presence data of plural observed clients B, C, D . . . by means of an RLS node 400. The block diagram of FIG. 4 likewise contains a P-CSCF node 302 and an S-CSCF node 304 in an IMS network of the watching client A. Further, plural presence servers 402 are shown providing presence data on the observed clients B, C, D . . . , respectively. It is assumed that client A frequently receives notifications with presence data of the observed clients from the RLS node 400, by means of an established RLS subscription. RLS node 400 has also established individual back-end subscriptions with the presence servers 402 for each of the observed clients.

Client A decides to withhold the notifications temporarily and terminates the RLS subscription by sending a terminating SIP SUBSCRIBE request (expires=0) within the existing dialogue to the P-CSCF node 302, in a first step 4:1. The P-CSCF routes the request to the RLS node 400 in a step 4:2. The RLS must now terminate all existing back-end subscriptions with presence servers 402, which may be in the range of 10-100, and thus sends terminating SIP SUBSCRIBE requests (expires=0) within the existing dialogues for each presence server subscription, as illustrated in a step 4:3. The RLS node will then naturally receive no further notifications from the presence servers 402.

Sooner or later, client A decides to re-create the subscription and sends an initial SIP SUBSCRIBE request (expires>0) to the P-CSCF 302, in a next step 4:4. The P-CSCF accordingly routes the request to the S-CSCF 304 handling the resource pointed out in the request, in a following step 4:5. The S-CSCF then routes the request to the RLS node 400 to create the RLS subscription for client A, in a next step 4:6.

The RLS node 400 now creates a back-end subscription for each presence server 402 being pointed out by the initial RLS subscription (which may be predefined or ad-hoc), and sends an initial SIP SUBSCRIBE request to the S-CSCF node 304 for the presence server subscriptions, in a further step 4:7. Finally, the S-CSCF node 304 routes a subscription request to each presence server 402 to activate the respective subscriptions, in a step 4:8.

In the above-described conventional solutions of terminating the subscription to withhold notifications, considerable efforts and signalling are required to terminate and re-create presence subscriptions in this manner, as several messages must be communicated between different network nodes and elements, also introducing latency. Re-creating the subscription further requires that a new dialogue is established between the watching client and the presence server, having released the previous dialogue to withhold the notifications.

Further, any client publications and presence updates occurring during the suspension period will never be notified to the watcher. In particular, when an RLS is used in the case of a subscription for plural observed clients, different presence servers of those clients will continuously send notifications to the RLS that will be lost in the current solution. Hence, it would be desirable to avoid or at least reduce the problems above when temporarily withholding notifications with presence or client data to watching clients.

SUMMARY

The object of the present invention is to address the problems outlined above. In particular, it is an object of the present invention to provide a solution that can generally reduce the signalling and number of messages necessary for temporarily withholding notifications with client or presence data regarding one or more observed clients.

These objects and others may be obtained by using a method and arrangement according to the attached independent claims.

According to one aspect, the present invention provides a method of withholding notifications with client data of at least one observed client, as executed by a user equipment of a watching client. The watching client has an ongoing subscription for receiving the notifications from a client data server. When a subscription suspend trigger is received, a subscription suspend message is sent to the client data server indicating that client data notifications should be temporarily withheld while still retaining the subscription. When a subscription resume trigger is received later, a subscription resume message is sent to the client data server indicating that client data notifications should be delivered again. Client data notifications are then received as normal according to said subscription.

Buffered client data notifications may be received retroactively in response to the subscription resume message, after being buffered by the client data server during the suspension period.

The client data notifications may relate to plural observed clients, and the client data server may be a client data aggregating server receiving client data notifications from plural client data server associated with the observed clients.

Any of the subscription suspend and resume messages may be an SIP SUBSCRIBE message with a specific indication that the subscription shall be suspended or resumed, respectively, either included in a new header or added as an optional parameter to an existing header in the SIP SUBSCRIBE message.

If an IMS network is used, the subscription suspend and resume messages are first routed to a P-CSCF node in the IMS network for further routing to the client data server.

Only notifications of specific observed clients and/or specific notification event types may be withheld, while other notifications are allowed to be received during the suspension period.

The subscription suspend trigger may be received as a manual user input command, or automatically when the user is occupied in a session or call or when the user has been inactive for a preset duration. The subscription resume trigger may also be received as a manual user input command, or automatically when a session or call is finished or when the user becomes active again after a period of inactivity.

According to another aspect, the present invention provides an arrangement in a user equipment of a watching client, comprising means for executing the method above.

According to yet another aspect, the present invention provides a method of withholding notifications with client data of at least one observed client to a watching client, as executed by a client data server adapted to provide the notifications. Again, the watching client has an ongoing subscription for receiving the notifications from the client data server. When a subscription suspend message is received from the watching client, the client data notifications are withheld while still retaining the subscription and server resources needed for providing the notifications. When a subscription resume message is later received from the watching client, client data notifications are again sent to the watching client as normal according to the subscription.

Client data notifications are preferably buffered during the suspension period, and the buffered client data notifications may be delivered to the watching client retroactively in response to the subscription resume message.

Only notifications of specific observed clients and/or specific notification event types may be delivered retroactively after the suspension period, while other notifications are discarded.

The client data notifications may relate to plural observed clients, and the client data server may be a client data aggregating server receiving client data notifications from plural client data servers associated with the observed clients according to individual back-end subscriptions. All or some of the back-end subscriptions with the client data servers may then be suspended during the suspension period.

Only some notifications of specific observed clients and/or specific notification event types may be withheld, while other notifications are allowed to be delivered during the suspension period.

According to yet another aspect, the present invention provides an arrangement in a client data server, comprising means for executing the method above.

Further features of the present invention and its benefits can be understood from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention can be used for temporarily withholding notifications with client or presence data to a watching client, without requiring the termination and re-creation of a client data subscription. The subscription and associated resources in a server providing client data are thus maintained throughout the period of suspension, although no notifications are to be sent during this period to the watching client.

In order to initiate a suspension period, the watching client sends a subscription suspend message to the client data server containing information indicating that the subscription shall be temporarily suspended. Later, the watching client sends a subscription resume message containing information indicating that the suspended subscription shall be resumed, allowing client data notifications to be delivered again.

Any pending client data notifications may be either buffered at the client data server to be delivered "retroactively" to client A once the subscription is resumed, or simply discarded during the suspension period. These options could be determined by the client user, e.g. by including different sub-information in the subscription suspend request or by means of preset client preferences. The actual subscription will be maintained as normal in the presence or client data server, apart from not sending notifications, and should be refreshed not to expire according to regular procedures during the suspension period.

Suspending the subscription can be triggered either by a manual input command from the user, e.g. when not wanting to be disturbed, or automatically by the terminal itself when the client is occupied in a session or call or has been inactive for a preset duration, e.g., by not using the key pad or retrieving the address book, etc. In the same manner, resuming the subscription can also be triggered either by the user or the terminal.

In the following description, the term "presence data" will be used to represent any client data that is made available, or "observed", as described above. Even though the following embodiments are generally described in terms of presence services, the invention is not limited thereto but can be implemented for any applications and services using the client data subscribe mechanism.

Further, the "client data server" in the below embodiments could be any server capable of providing requested client data of one or more observed clients to authorised watching clients, e.g. a presence server or RLS node as described for FIGS. 3 and 4, respectively. Reference will also be made to well-known SIP messages, although the present invention is generally not limited thereto.

An embodiment will now be described with reference to a signalling procedure in a block diagram shown in FIG. 5, involving a watching client A, a session control node 500 such as a P-CSCF node, and a client data server 502 capable of providing client data of an observed client B (not shown). It is assumed that a subscription has been created for client data notifications as described above, and that client A accordingly receives notifications with presence data of client B from client data server 502 in an ongoing dialogue. If an IMS network is used, it is not necessary to involve the S-CSCF node for creating a new subscription in this embodiment, in contrast to the prior art procedure of FIG. 3.

Initially, the user of client A decides to suspend the subscription temporarily, as triggered by a suitable manual input command in the used terminal. Alternatively, the terminal itself may also trigger suspension of the subscription automatically as described above, e.g. when occupied in a session or call. The suspension trigger is illustrated as a first step 5:1. In either case, client A sends a subscription suspend request to the session control node 500 within the existing dialogue, in a next step 5:2. In an IMS network, the subscription suspend request can be an SIP SUBSCRIBE message with a specific indication that the subscription shall be suspended. This indication can either be included in a new header or added as an optional parameter to an existing header in the SIP SUBSCRIBE message.

In this case, it is not necessary to provide an expiry time for the subscription specifically in the suspend message, being independent of the routine of refreshing the subscription which is still maintained during the suspension period, as described above. However, it is possible to follow the prevailing standard for SIP SUBSCRIBE messages and provide a new expiry time>0 in the suspend message at this point, depending on the implementation.

The session control node 500 then routes the subscription suspend request to the client data server 502, in a step 5:3. Thereby, server 502 suspends the subscription by not sending any notifications to client A for the time being, but retains all server resources reserved for the subscription for registering received publication messages from client B. It should be noted that the existing dialogue between client A and client data server 502 is still retained throughout the suspension period.

At the same time, server 500 preferably buffers any client data notifications that would otherwise be sent to client A according to the subscription, which is illustrated by a step 5:4. Alternatively, any current client data notifications may be simply discarded during the suspension period. The handling of pending client data notifications during the suspension period may be determined by the client user, e.g. as indicated in the subscription suspend request or according to predetermined preferences stored in the network as client parameters.

At some point later, client A will resume the subscription again, which may be triggered by another manual input command from the user, or automatically by the terminal itself, e.g., when a session or call is finished or when the user gets active again after a period of inactivity. The resume trigger is illustrated as a further step 5:5. In either case, client A sends a subscription resume request to the session control node 500 within the still retained dialogue, in a next step 5:6.

In an IMS network, the subscription resume request can be an SIP SUBSCRIBE message with a specific indication that the subscription shall be resumed, as similar to the suspend request of step 5:2. Thus, the resume indication may be either included in a new header or added as an optional parameter to an existing header in the SIP SUBSCRIBE message.

In a next step 5:7, the session control node 500 then routes the subscription resume request to the client data server 502 where the subscription is resumed. In response thereto, server 502 will send all buffered notifications to client A, if any, and also further notifications as they occur according to regular procedures, as illustrated in a final step 5:8.

Figure 5:
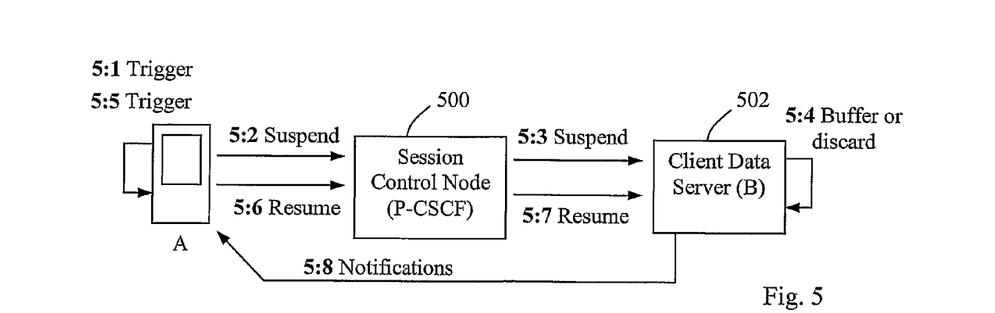
FIG. 5 is a block diagram illustrating a procedure for withholding notifications with client data of an observed client, according to one embodiment.

The above-described procedure of FIG. 5 can be modified in different ways. For example, only some notifications, e.g. specific observed clients and/or specific notification event types, may be withheld during the suspension period whereas others are allowed to be delivered to client A. Such a selective notification delivery which may be controlled according to a filter function or the like. This filter may be specified in the subscription suspend request of step 5:2, or may be predefined in the network as a preference of client A. Further, it is possible to deliver only some of the buffered notifications after the suspension period, whereas others could be discarded by means of a similar filter function as above for, e.g., specific observed clients and/or specific notification event types.

Figure 6:
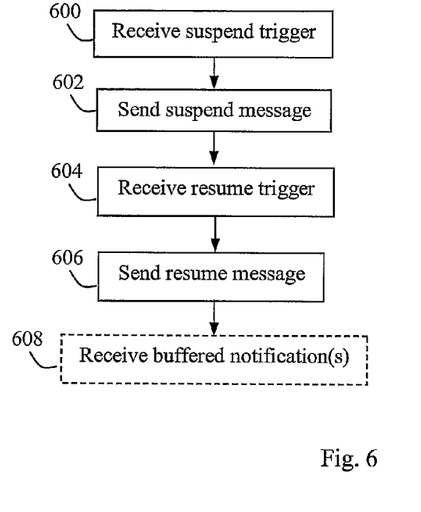
FIG. 6 is a flow chart with steps in a procedure executed by a user equipment of a watching client for withholding notifications with client data of an observed client, according to another embodiment.

In FIG. 6, a flow chart is shown of a procedure executed by a user equipment of a watching client for withholding notifications with client data of an observed client, according to another embodiment. This procedure may basically correspond to the example shown in FIG. 5 with respect to client A. Thus, it is assumed that the watching client has an ongoing subscription for notifications with client data of one or more observed clients, and that a dialogue has been established with a client data server or RLS providing the notifications.

In a first step 600, a subscription suspend trigger is received indicating that no notifications should be communicated for the time being. The suspend trigger may be received either from the user or automatically in response to the establishment of a session or call, or when the user has been inactive for a preset period of time.

In a next step 602, a subscription suspend message is sent to the client data server or RLS providing the notifications, which may be routed over a session control node such as a P-CSCF node in an IMS network, as shown in FIG. 5. The subscription suspend message includes an indication that no notifications should be sent to the watching client, as described above for step 5:2 in FIG. 5.

In a further step 604, a subscription resume trigger is received indicating that the communication of notifications should be resumed again. In a similar manner, the resume trigger may be received either from the user or automatically in response to the termination of a session or call, or when the user becomes active after a period of inactivity. A subscription resume message is then sent to the client data server or RLS providing the notifications, in a next step 606, including an indication indicating that notifications should be delivered to the watching client again, as described above for step 5:6 in FIG. 5. The resume message may be likewise routed over a session control node (e.g. P-CSCF node).

In a final and optional step 608, any buffered notifications may be received, if such notifications are pending and depending on whether notification buffering is required in the client data server or RLS. Any following regular notifications will also be received as well, not shown.

Figure 7:
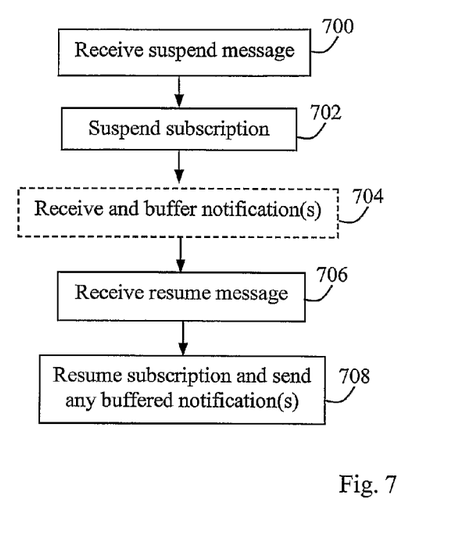
FIG. 7 is a flow chart with steps in a procedure executed by a client data server for withholding notifications with client data of an observed client, according to yet another embodiment.

In FIG. 7, a flow chart is shown of a procedure executed by a client data server or the like for withholding notifications with client data of an observed client to a watching client, according to yet another embodiment. This procedure may basically correspond to the example shown in FIG. 5 with respect to client A, but may also be executed by an RLS node or similar acting as an exploder for plural observed clients. Further, the watching client basically acts according to the flow chart of FIG. 6. Thus, it is assumed that the watching client has an ongoing subscription for notifications with client data of one or more observed clients, and that a dialogue has been established with the watching client for providing the notifications.

In a first step 700, a subscription suspend message is received from the watching client as of step 602 in FIG. 6. The subscription is then suspended accordingly in a step 702 but not terminated, also retaining the existing dialogue with the watching client. Naturally, no final notification is sent at this point in contrast to the conventional solution.

During the suspension period, the client data server may continue to receive client data notifications for the observed client(s) which may be buffered as pending notifications for later delivery to the watching client, as illustrated by a next optional step 704. As described above, the question whether notifications should be buffered or discarded during the suspension period may be subject to the watching client's preferences.

At some point later, a subscription resume message is received from the watching client as of step 606 in FIG. 6, in a further step 706. The subscription is then resumed accordingly in a final step 708, and any buffered notifications are optionally sent to the client, depending on whether notification buffering is required in the client data server or RLS and if such notifications are pending. It may be preferred that an initial notification is normally sent when resuming a subscription. Any following regular notifications will of course also be sent to the client as well, not shown.

The present invention can also be used when a watching client subscribes to client data according to a list of plural observed clients, where an RLS node or the equivalent is used for providing aggregated notifications, as mentioned above.

Figure 8:
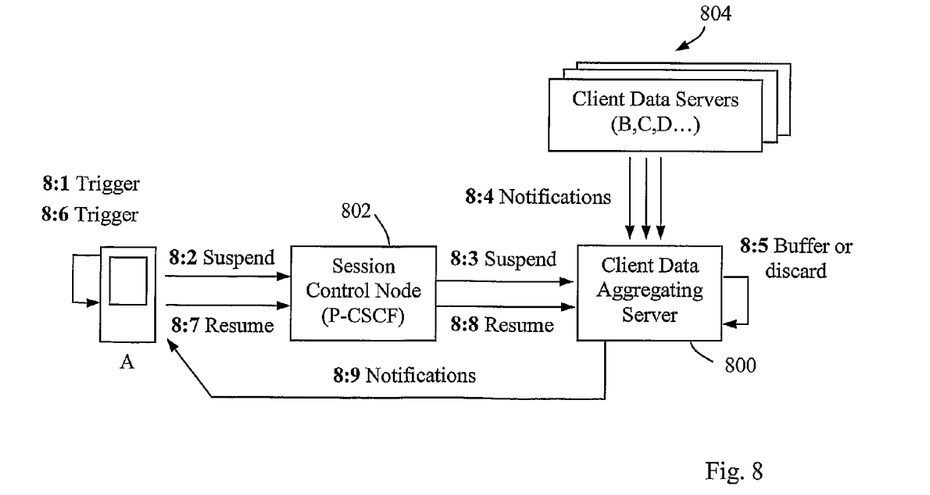
FIG. 8 is a block diagram illustrating a procedure for withholding notifications with client data of plural observed clients using an RLS node, according to yet another embodiment.

FIG. 8 is a block diagram illustrating a procedure for withholding notifications with client data of plural observed clients using a client data aggregating server 800 and a session control node 802 such as a P-CSCF node, according to yet another embodiment. The client data aggregating server 800 is capable of providing aggregated client data notifications on plural observed clients in the manner of an RLS node or exploder, based on individual back-end subscriptions for notifications from their respective client servers 804, as described above. It is assumed that client A receives notifications from the aggregating server 800 in an ongoing dialogue according to a previously created subscription. Again, it is not necessary to involve an S-CSCF node in an IMS network for creating new subscriptions with multiple client data servers in this embodiment, in contrast to the conventional procedure of FIG. 4.

Several steps in FIG. 8 correspond to steps in the procedure illustrated in FIG. 5, and it is therefore not necessary to repeat the detailed description here. A suspension trigger is illustrated as a first step 8:1, as in step 5:1 in FIG. 5. In response thereto, client A sends a subscription suspend request to the session control node 804 within the existing dialogue, in a next step 8:2, which may be an SIP SUBSCRIBE message, as in step 5:2 in FIG. 5. The session control node 802 then routes the subscription suspend request to the aggregating server 800, in a step 8:3.

Server 800 then suspends the subscription but retains all server resources reserved for the subscription as well as the existing dialogue with client A and all back-end subscriptions with the client data servers 804. This means that server 800 will continue to receive notifications from client data servers 804 according to the back-end subscriptions, as illustrated by a schematic step 8:4. During the suspension period, server 500 may buffer these notifications or they may be discarded in a step 8:5, as in step 5:4 in FIG. 5. Alternatively, the client data aggregating server 800 may suspend all or some of the back-end subscriptions with the client data servers 804 during the suspension period, and no notifications will then be received from those client data servers 804. In the case of extensive suspension periods, the watching client A or the client data aggregation server 800 may decide to suspend the back-end subscriptions.

A resume trigger is illustrated in a step 8:6, and client A sends a subscription resume request to the session control node 802 within the existing dialogue in a step 8:7, thus wholly corresponding to steps 5:6 and 5:7 in FIG. 5, respectively. Again, the subscription resume request as well as the earlier subscription suspend request may be SIP SUBSCRIBE messages as described for FIG. 5.

The session control node 802 then routes the subscription resume request to the aggregating server 800 in a further step 8:8, and server 800 will initially send the buffered notifications to client A, if any, and also further notifications according to regular procedures, in a final step 8:9.

Figure 9:
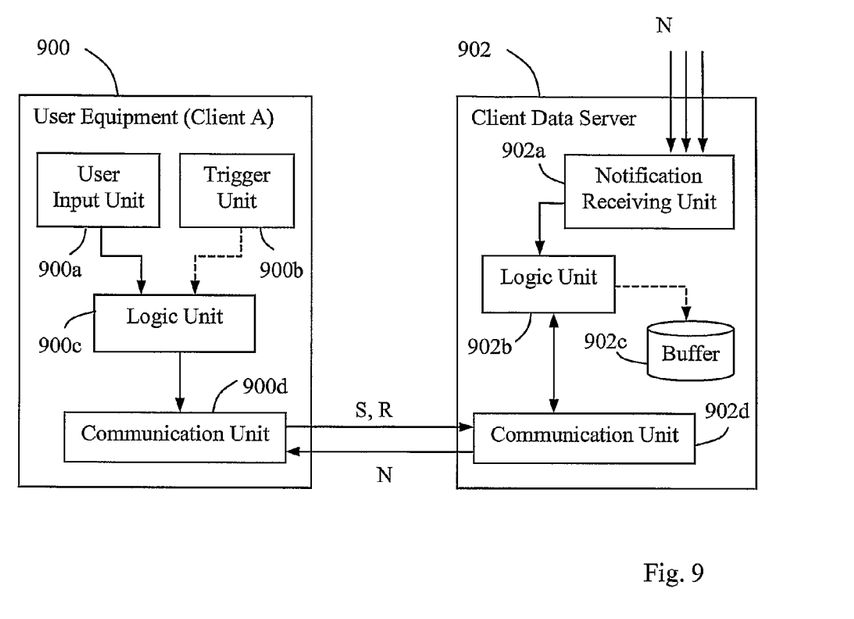
FIG. 9 is a block diagram illustrating a user equipment of a watching client and a client data server capable of providing client data of one or more observed clients, according to further embodiments.

FIG. 9 is a block diagram illustrating in more detail a user equipment 900 of a watching client A and a client data server 902 when providing client data of one or more observed clients (not shown) to the watching client, according to further embodiments. The various components in the figure are merely illustrated as logical functional units and can be implemented by means of any suitable combinations of hardware and software.

The user equipment 900 comprises a user input unit 900a adapted to provide subscription suspend and resume triggers in response to manual user input commands. A trigger unit 900b may also be arranged to provide a subscription suspend triggers automatically. The user input unit 900a and the trigger unit 900b are adapted to operate basically in the manner described for steps 5:1 and 5:5 in FIG. 5, and for steps 8:1 and 8:6 in FIG. 8, respectively.

The user equipment 900 further comprises a logic unit 900c adapted to create a subscription suspend message and a subscription resume message in response to the above-described triggers. A communication unit 900d is adapted to send the created subscription suspend and resume messages S, R to the client data server 902, basically in the manner described for steps 5:2 and 5:6 in FIG. 5, and for steps 8:2 and 8:7 in FIG. 8, respectively. The communication unit 900d is also adapted to receive notifications N from the client data server 902, basically in the manner described for step 5:8 in FIG. 5, and for step 8:9 in FIG. 8, respectively.

The client data server 902 comprises a notification receiving unit 902a adapted to receive client data notifications N regarding the one or more observed clients, from the clients themselves or from their networks, or from associated client data servers based on back-end subscriptions, as described for step 8:4 in FIG. 8.

The client data server 902 further comprises a logic unit 902b adapted to suspend and resume the subscription and create client data notifications to the watching client. The logic unit 902b may also be adapted to store notifications N received during a suspension period in a buffer memory 902c, if required to do so, basically in the manner described for step 5:4 in FIG. 5, and for step 8:5 in FIG. 8, respectively.

A communication unit 902d in client server 902 is adapted to receive subscription suspend and resume messages S, R from client A's user equipment 900, and the logic unit 902b is further adapted to control the subscription accordingly. The communication unit 902d is also adapted to deliver client data notifications to the watching client, basically in the manner described for step 5:8 in FIG. 5, and for step 8:9 in FIG. 8, respectively.

A watching client that wants to use the suspend/resume function needs a way to discover if the client data server supports the function. This can be done according to three alternatives described below:

1) The watching client may indicate in the initial subscription request that it supports the suspend/resume function, such that the client data server can indicate in a response whether it supports the function or not.

2) The client data server may indicate by default in all regular responses in an ongoing dialogue that it supports the suspend/resume function.

3) The watching client may send a subscription suspend request, and if the client data server does not support the suspend/resume function will then return a regular response plus a full notification message. The client can then stop using the function for this dialogue.

The present solution can also be configurable and not only controlled by the terminal in real time. This would mean that the user of the watching client or his/her operator can determine and configure specific occasions or time periods when a client data subscription shall be temporarily suspended. Other entities in the watching client's access network, such as stateful proxies being aware of the existing subscriptions, may also suspend subscriptions at specific occasions or time periods occasions, such as when parts of the access network are unavailable or subject to heavy loads.

The present invention can be used to suspend/resume subscriptions without having to terminate and create the subscriptions, thereby saving considerable efforts and signalling activities. In general, the following advantages can be mentioned:

1) The subscription can be suspended temporarily by using existing mechanisms with small extensions to the existing standard requests (e.g. a new additional header or extra data in an existing header). It is only necessary to adapt the watching client's user equipment and the client data server for implementing the suspend/resume function. Thus, any existing proxies such as IMS Core are not affected.

2) The suspension can be done without loosing notifications being generated during the suspension period. This is particularly useful in the case of an exploder function such as RLS.

3) The present invention enables a reduced amount of signalling messages that needs to be sent in the network, which means that the performance can be increased and the latency for resuming the subscription is improved, especially in the case of an exploder. The performance can also be enhanced as the functionality for terminating and re-creating one or more client data subscriptions according to the conventional procedures outlined in the background section are not needed at the watching client and the client data server, nor in any state-full proxies.

While the invention has been described with reference to specific exemplary embodiments, the description is generally only intended to illustrate the inventive concept and should not be taken as limiting the scope of the invention, which is defined by the appended claims. The IMS technology and the SIP signalling protocol have been occasionally used when describing the above embodiments, although any other standards and protocols suitable for implementing the present invention may basically be used.

The invention claimed is:

1. A method of withholding notifications with client data of at least one observed client, as executed by a user equipment of a watching client, wherein the watching client has an ongoing subscription for receiving said notifications from a client data server, comprising the following steps:
receiving by the user equipment, a subscription suspend trigger, either as a manual user input command or automatically when the user is occupied in a session or call or when the user has been inactive for a preset duration;
sending a subscription suspend message from the user equipment to the client data server during the ongoing subscription in response to the subscription suspend trigger, the subscription suspend message indicating that client data notifications should be temporarily withheld while retaining said subscription;
subsequently receiving by the user equipment, a subscription resume trigger, either as a manual user input command or automatically when the session or call is finished or when the user becomes active again after a period of inactivity;
sending a subscription resume message from the user equipment to the client data server in response to the subscription resume trigger, the subscription resume message indicating that the suspended subscription shall be resumed and allowing client data notifications to be delivered again; and
subsequently receiving by the user equipment, client data notifications according to said subscription.

2. The method according to claim 1, wherein the step of subsequently receiving client data notifications includes receiving buffered client data notifications retroactively in response to the subscription resume message, after being buffered by the client data server during the suspension period.

3. The method, according to claim 1, wherein the client data notifications relate to plural observed, clients, and said client data server is a client data aggregating server receiving client data notifications from plural client data servers associated with said observed clients.

4. The method according to claim 1, wherein the subscription suspend message is an SIP SUBSCRIBE message with a specific indication that the subscription shall be suspended, wherein the indication is either included in a new header or added as an optional parameter to an existing header in the SIP SUBSCRIBE message.

5. The method according to claim 1, wherein the subscription resume message is an SIP SUBSCRIBE message with a specific indication that the subscription shall be resumed, wherein the indication is either included in a new header or added as an optional parameter to an existing header in the SIP SUBSCRIBE message.

6. The method according to claim 1, wherein said subscription suspend and resume messages are first routed to a P-CSCF node in an IMS network for further routing to the client data server.

7. The method according to claim 1, wherein only notifications of specific observed clients or specific notification event types are withheld, while other notifications are allowed to be received during the suspension period.

8. An arrangement in a user equipment of a watching client for withholding notifications with client data of at least one observed client when the watching client has an ongoing subscription for receiving said notifications from a client data server, wherein the arrangement includes a processor coupled to a non-transitory memory that stores computer program instructions, wherein when the processor execrates the computer program instructions, the arrangement is caused to:
receive a subscription suspend trigger, either as a manual user input command or automatically when the user is occupied in a session or call or when the user has been inactive for a preset duration;
send a subscription suspend message to the client data server during the ongoing subscription in response to the subscription suspend trigger, the subscription suspend message indicating that client data notifications should be temporarily withheld while retaining said subscription;
subsequently receive a subscription resume trigger, either as a manual user input command or automatically when the session or call is finished or when the user becomes active again after a period of inactivity;
send a subscription resume message to the client data server in response to the subscription resume trigger, the subscription resume message indicating that the suspended subscription shall be resumed and allowing client data notifications to be delivered again; and
subsequently receive client data notifications according to said subscription.

9. A method of withholding notifications with client data of at least one observed client to a watching client, as executed by a client data server that provides the notifications, wherein the watching client has an ongoing subscription for receiving the notifications from the client data server, the method comprising the following steps:
receiving by the client data server, a subscription suspend message from the watching client during the ongoing subscription, the subscription suspend message indicating that the client data notifications should be temporarily withheld while retaining said subscription;
withholding by the client data server, the client data notifications while retaining said subscription and server resources needed for providing the client data notifications;
subsequently receiving by the client data server, a subscription resume message from the watching client, the subscription resume message indicating that client data notifications should be delivered again; and
sending client data notifications from the client data server to the watching client according to said subscription in response to said subscription resume message.

10. The method according to claim 9, further comprising the steps of:
buffering client data notifications by the client data server during the suspension period; and
delivering the buffered client data notifications to the watching client retroactively, in response to said subscription resume message.

11. The method according to claim 10, wherein the step of retroactively delivering the buffered client data notifications includes delivering only notifications of specific observed clients and/or specific notification event types, while discarding other notifications.

12. The method according to claim 9, wherein the client data notifications relate to plural observed clients, and said client data server is a client data aggregating server, the method further comprising receiving client data notifications from plural client data servers associated with said observed clients according to individual back-end subscriptions.

13. The method according to claim 12, further comprising suspending by the client data server, all or some of the back-end subscriptions with the client data server during the suspension period.

14. The method according to claim 9, wherein the step of receiving the subscription suspend message includes receiving a SIP SUBSCRIBE message with a specific indication that the subscription shall be suspended, either included in a new header or added as an optional parameter to an existing header in the SIP SUBSCRIBE message.

15. The method according to claim 9, wherein the step of subsequently receiving the subscription resume message includes receiving a SIP SUBSCRIBE message with a specific indication that the subscription shall be resumed, either included in a new header or added as an optional parameter to an existing header in the SIP SUBSCRIBE message.

16. The method according to claim 9, wherein said subscription suspend and resume messages are received from a P-CSCF node in an IMS network, the P-CSCF node having routed said messages from the watching client.

17. The method according to claim 9, wherein the step of withholding the client data notifications includes withholding only some notifications of specific observed clients and/or specific notification event types, while delivering other notifications during the suspension period.

18. An arrangement in client data server that provides to a watching client, notifications with client data of at least one observed client, the arrangement for temporarily withholding said notifications to the watching client when the watching client has an ongoing subscription for receiving said notifications from the client data server, wherein the arrangement includes a processor coupled to a non-transitory memory that stores computer program instructions, wherein when the processor executes the computer program instructions, the arrangement is caused to:

receive a subscription suspend message from the watching client during the ongoing subscription, the subscription suspend message indicating that client data notifications should be temporarily withheld while retaining said subscription;

withhold said client data notifications while retaining said subscription and serer resources needed for providing said client data notifications;

subsequently receive a subscription resume message from the watching client, the subscription resume message indicating that client data notifications should be delivered again; and send client data notifications to the watching client according to said subscription, in response to said subscription resume message.

19. The arrangement according to claim 18, wherein the arrangement is configured to:

buffer client data notifications during the suspension period; and send the buffered client data notifications retroactively to the watching client in response to said subscription resume message.

20. The arrangement according to claim 19, wherein the arrangement is further configured to send only notifications of specific observed clients and/or specific notification event types retroactively after the suspension period, while other notifications are discarded.

21. The arrangement according to claim 18, wherein the client data notifications relate to plural observed clients, and said client data server is a client data aggregating server that receives client data notifications from plural client data server associated with said observed clients according to individual back-end subscriptions.

22. The arrangement according to claim 21, wherein the client data aggregating server is configured to suspend all or some of the back-end subscriptions with the client data servers during the suspension period.

23. The arrangement according to claim 18, wherein the arrangement is further configured to withhold only some notifications of specific observed clients or specific notification event types, while other notifications are allowed to be delivered during the suspension period.

* * * * *

UNITED STATES PATENT AND TRADEMARK OFFICE
CERTIFICATE OF CORRECTION

PATENT NO. : 8,589,496 B2
APPLICATION NO. : 12/518600
DATED : November 19, 2013
INVENTOR(S) : Boberg et al.

It is certified that error appears in the above-identified patent and that said Letters Patent is hereby corrected as shown below:

On the Title Page, Item (56), under "OTHER PUBLICATIONS", in Column 2, Line 1, delete "Verison" and insert -- Version --, therefor.

On Title Page 2, in Item (56), under "OTHER PUBLICATIONS", in Column 2, Line 6, delete "Vers;on" and insert -- Version --, therefor.

On Title Page 2, in Item (56), under "OTHER PUBLICATIONS", in Column 2, Line 8, delete "http://member.openmob;leall;ance." and insert -- http://member.openmobilealliance. --, therefor.

In the Drawings

In Fig. 4, Sheet 2 of 4, for Tag "400", in Line 2, delete "Aggergating" and insert -- Aggregating --, therefor.

In the Specification

In Column 1, Lines 51-54, delete "Session Control .... of today." and insert the same at Line 50, after "(Proxy Call", as a continuation paragraph.

In Column 8, Line 61, delete "server 500" and insert -- server 502 --, therefor.

In Column 11, Line 4, delete "session control node 804" and insert -- session control node 802 --, therefor.

In Column 11, Lines 15-16, delete "server 500" and insert -- server 502 --, therefor.

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,589,496 B2

In Column 12, Line 11, delete "FIG. 8, respectively." and insert the same at Line 10, after "step 8:5 in", as a new continuation paragraph.

In the Claims

In Column 13, Line 51, in Claim 3, delete "method," and insert -- method --, therefor.

In Column 13, Line 52, in Claim 3, delete "observed," and insert -- observed --, therefor.

In Column 14, Line 15, in Claim 8, delete "execrates" and insert -- executes --, therefor.

In Column 14, Line 59, in Claim 9, delete "subscription" and insert -- subscription, --, therefor.

In Column 15, Line 37, in Claim 18, delete "in client" and insert -- in a client --, therefor.

In Column 16, Line 7, in Claim 18, delete "serer" and insert -- server --, therefor.